United States Patent [19]

Korenberg

[11] Patent Number: 4,469,050

[45] Date of Patent: Sep. 4, 1984

[54] FAST FLUIDIZED BED REACTOR AND METHOD OF OPERATING THE REACTOR

[75] Inventor: Jakob Korenberg, York, Pa.

[73] Assignee: York-Shipley, Inc., York, Pa.

[21] Appl. No.: 331,767

[22] Filed: Dec. 17, 1981

[51] Int. Cl.³ .............................................. F22B 1/02
[52] U.S. Cl. .................................... 422/4 D; 110/245
[58] Field of Search .............. 122/4 D; 110/245, 244, 110/243, 234

[56] References Cited

U.S. PATENT DOCUMENTS

| | | | |
|---|---|---|---|
| 3,366,080 | 1/1968 | Albertson | 110/245 |
| 3,565,022 | 2/1971 | Bishop | 110/245 |
| 3,577,938 | 5/1971 | Muirhead | 110/245 |
| 3,834,327 | 9/1974 | Hellstrom et al. | |
| 3,888,193 | 6/1975 | Kishigami et al. | 110/245 |
| 3,938,259 | 2/1976 | Ormos et al. | |
| 4,032,305 | 6/1977 | Squires | |
| 4,052,172 | 10/1977 | Shirakawa et al. | |
| 4,075,953 | 2/1978 | Sowards | 110/245 |
| 4,159,000 | 6/1979 | Iwasaki et al. | 110/244 |
| 4,159,682 | 7/1979 | Fitch et al. | 110/245 |
| 4,259,911 | 4/1981 | Jones | 110/245 |

FOREIGN PATENT DOCUMENTS

| | | | |
|---|---|---|---|
| 1439159 | 4/1966 | France . | |
| 0016730 | 2/1979 | Japan | 110/245 |
| 0124567 | 9/1979 | Japan | 110/245 |
| 0000913 | 1/1981 | Japan | 110/245 |
| 400019 | 4/1981 | Japan | 110/245 |
| 0108018 | 8/1981 | Japan | 110/245 |
| 7416372 | 12/1974 | Netherlands . | |
| 858813 | 1/1961 | United Kingdom . | |
| 1147899 | 4/1969 | United Kingdom . | |
| 1450907 | 9/1976 | United Kingdom . | |
| 2059031 | 4/1981 | United Kingdom . | |

Primary Examiner—Henry C. Yuen
Attorney, Agent, or Firm—Finnegan, Henderson, Farabow, Garrett & Dunner

[57] ABSTRACT

A method of operating a fast fluidized bed reactor according to the invention comprises: (1) providing a substantially upright fluidized bed reactor containing a bed of granular material and having an upper and a lower region, the upper region having a cylindrically shaped interior surface; (2) feeding matter to be reacted into the lower region of the reactor; (3) supplying a first stream of pressurized air to the reactor through a plurality of openings in the lower region at a sufficient velocity to fluidize the granular material in the circulating regime, whereby at least a portion of the granular material is continually entrained upward into the upper region; (4) tangentially supplying a second stream of pressurized air to the upper region of the reactor through at least one opening in the cylindrical interior surface of the upper region; (5) maintaining a Swirl number of at least about 0.6 and a Reynolds number of at least about 18,000 in the upper region of the reactor for providing a cyclone of turbulence in the upper region which increases the rate of reaction in the reactor, wherein, at maximum operating capacity for the reactor, the second stream of air constitutes in excess of about 50% of the total pressurized air fed to the reactor; and (6) removing a portion of the granular material and reaction gases from the upper region of the reactor through an exit port situated adjacent to the upper boundary of the cyclone of turbulence, separating the portion of the granular material from the reaction gases and returning the separated granular material to the lower region of the reactor.

30 Claims, 5 Drawing Figures

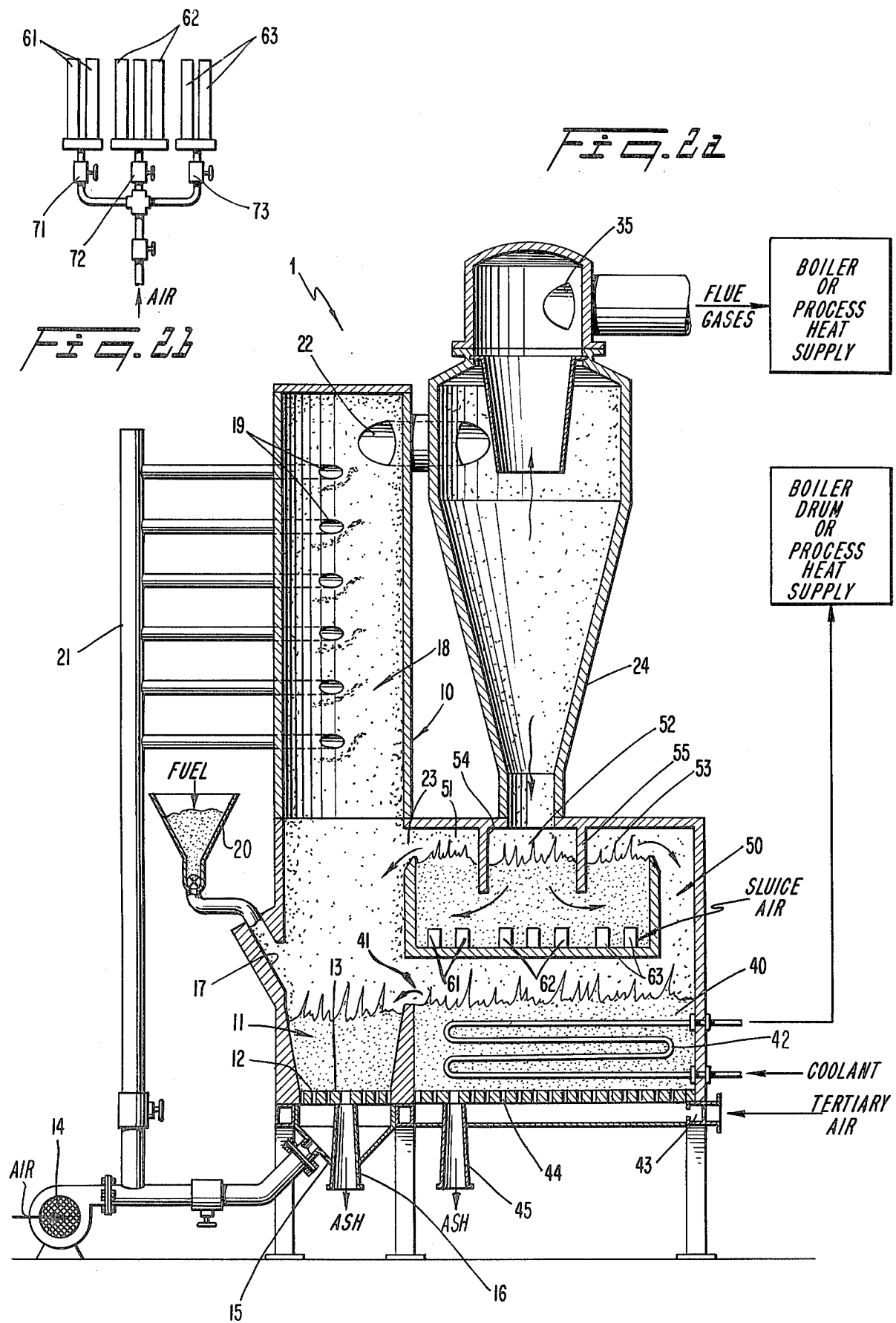

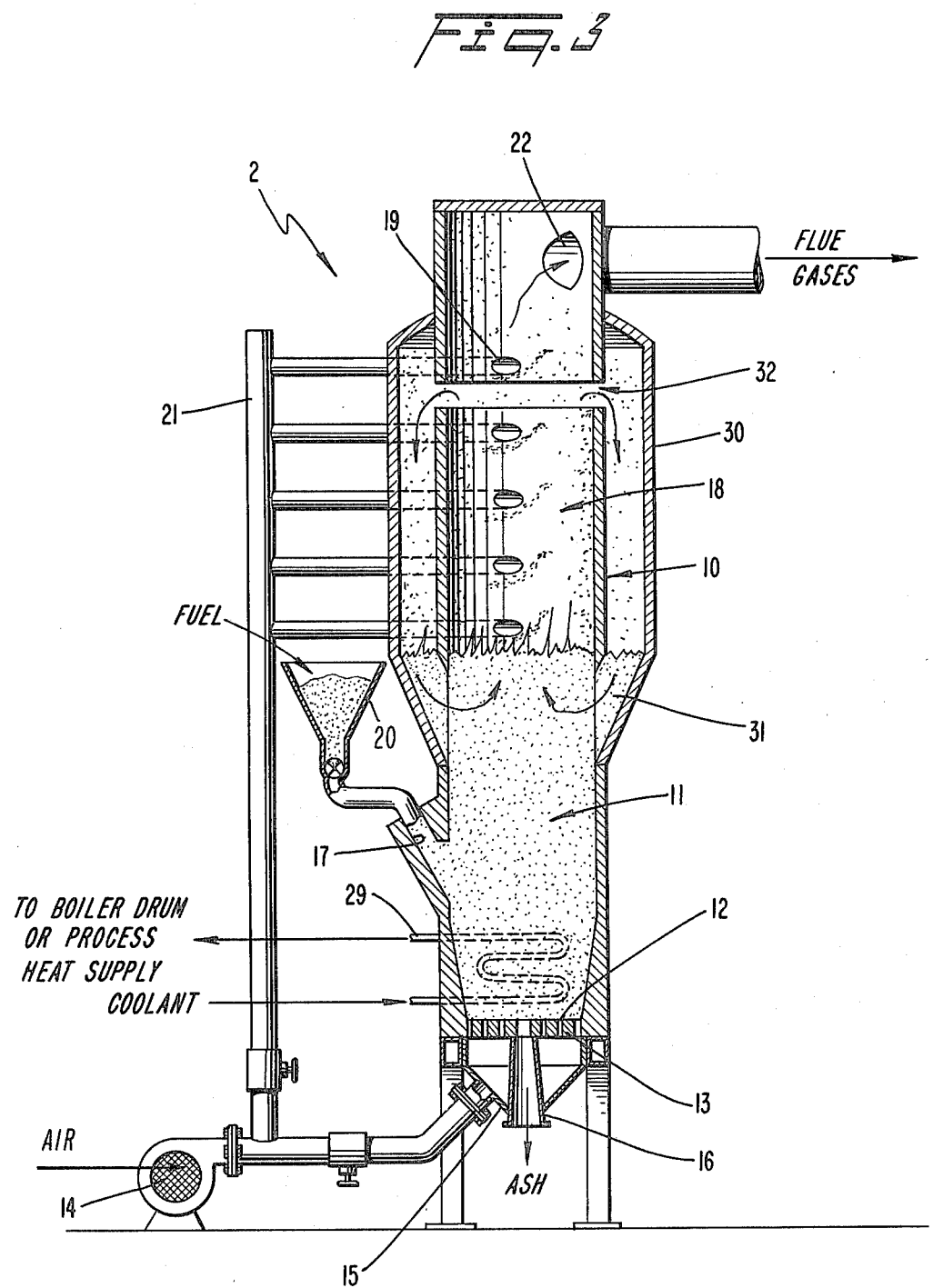

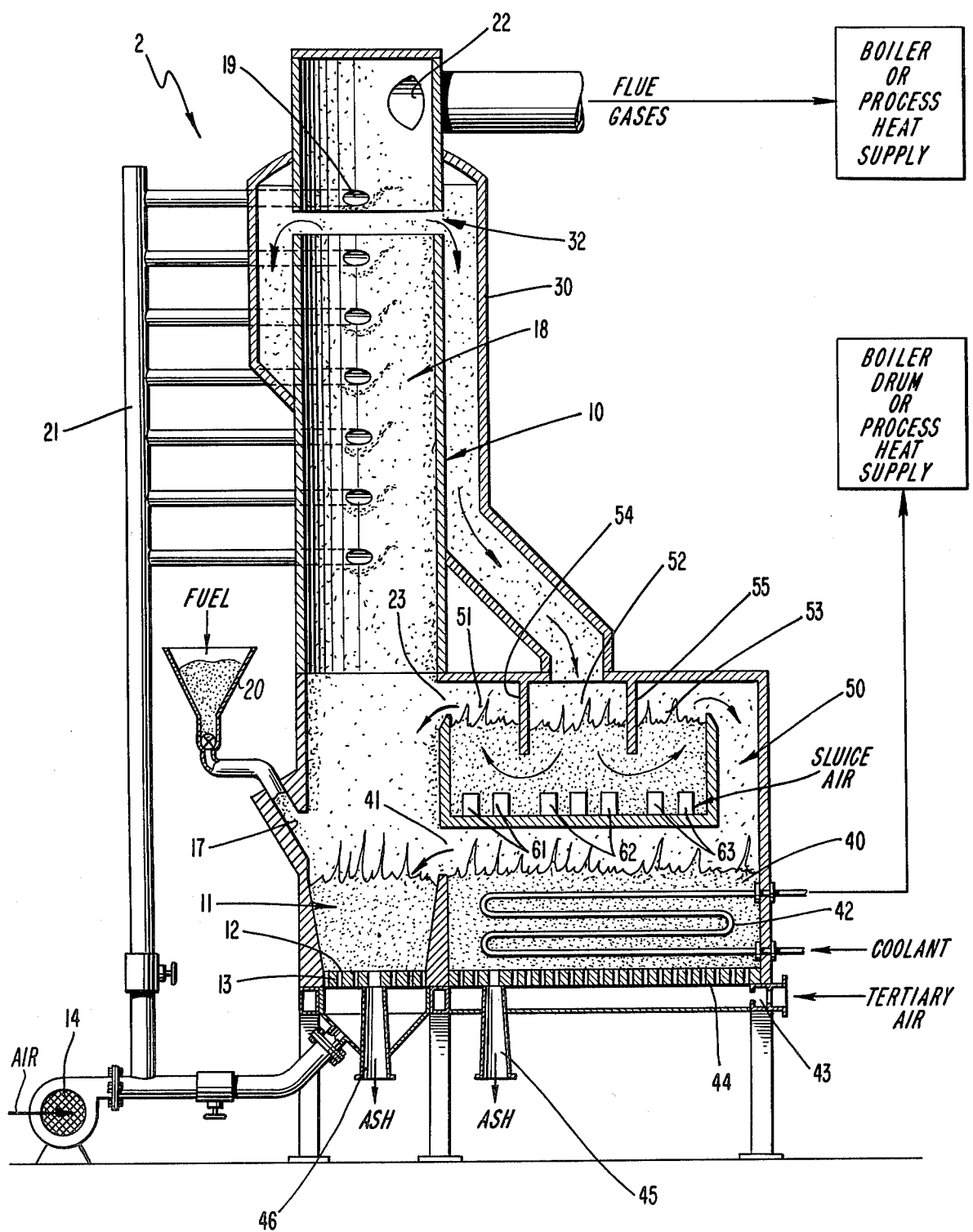

FAST FLUIDIZED BED REACTOR AND METHOD OF OPERATING THE REACTOR

BACKGROUND OF THE INVENTION

The present invention relates to an improved circulating, i.e., fast, fluidized bed reactor utilizing a cyclone of turbulent gases in the upper region of the reaction chamber, and to a method of operating the reactor; and, more particularly, to a reactor of this type utilizing cyclone particle separators and to a reactor of this type wherein such cyclone separators are eliminated.

The present invention has specific application, inter alia, to adiabatic fluidized bed combustors, fluidized bed boilers, and fluidized bed gasifiers. As used herein, and in the accompanying claims, "adiabatic combustor" denotes a fluidized bed combustor that does not contain internal cooling means, and "boiler" denotes a fluidized bed combustor that contains internal heat absorption means, in the form of immersed boiler, superheater, evaporator, and/or economizer heat exchange surfaces. The temperature of adiabatic fluidized bed combustors is typically controlled by the use of pressurized air in substantial excess of the stoichiometric amount needed for combustion. On the other hand, fluidized bed boilers require very low excess air, so that heat absorption means are required in the fluidized bed. Fluidized bed gasifiers, in contrast, utilize less than stoichiometric amounts of air.

The state of fluidization in a fluidized bed of solid particles is primarily dependent upon the diameter of the particles and the fluidizing gas velocity. At relatively low fluidizing gas velocities exceeding the minimum fluidizing velocity, e.g., a fluidization number in the range from about 2 to 10, the bed of particles is in what has been termed the "bubbling" regime. Historically, the term "fluidized bed" has denoted operation in the bubbling regime. This fluidization mode is generally characterized by a relatively dense bed having an essentially distinct upper bed surface, with little entrainment, or carry-over, of the bed particles (solids) in the flue gas, so that recycling the solids is generally unnecessary. At higher fluidizing gas velocities, above those of the bubbling regime, the upper surface of the bed becomes progressively diffuse and carry-over of the solids increases, so that recirculation of solids using a particulate separator, e.g., a cyclone separator, becomes necessary in order to preserve a constant solids inventory in the bed.

The amount of solids carry-over depends upon the fluidizing gas velocity and the distance above the bed at which the carry-over occurs. If this distance is above the transfer disengaging height, carry-over is maintained at a constant level, as if the fluidizing gas were "saturated" with solids.

If the fluidizing gas velocity is increased above that of the bubbling regime, the bed then enters what has been termed the "turbulent" regime, and finally, the "fast," i.e., "circulating," regime. If a given solids inventory is maintained in the bed, and the fluidizing gas velocity is increased just above that of the turbulent regime, the bed density drops sharply over a narrow velocity range. Obviously, if a constant solids inventory is to be preserved in the bed, the recirculation, or return, of solids must equal the carry-over at "saturation."

At fluidizing gas velocities below those associated with the aforementioned sharp drop in bed density, the effect upon bed density of returning solids to the fluidized bed at a rate well above the "saturation" carry-over is not marked. The addition of solids to a bed fluidized in either the bubbling or turbulent regime at a rate above the saturation carry-over will simply cause the vessel containing the fluidized bed to fill up continually, while the fluidized density will remain substantially constant. However, at the higher fluidizing gas velocities associated with the fast regime, the fluidized density becomes a marked function of the solids recirculation rate.

Fast fluidized beds afford intimate contact between the high velocity fluidizing gas and a large inventory of solids surface per unit bed volume. Also, slip velocity (i.e., solids-fluidizing gas relative velocity) is relatively high in fast fluidized beds, when compared with that in ordinary fluidized beds. Additionally, the combustion process which takes place in a fast fluidized bed combustor is generally more intense, having a higher combustion rate, than that occurring in traditional fluidized bed combustors. Furthermore, as a result of the high solids recirculation rate in fast fluidized beds, the temperature is essentially uniform over the entire height of such combustors.

The higher combustion reaction rate, compared to that of ordinary fluidized bed combustors, allows the combustion temperature in fast fluidized bed combustors to be significantly reduced. Reduction of the combustion temperature may be accomplished, for example, by inserting heat exchanger tubes in the combustion region. Reducing the combustion temperature leads directly to a reduction in the total cost of constructing fast fluidized bed boilers, since (1) the total boiler heat exchange surface can be reduced, (2) thinner refractory bed liners are required, and (3) smaller cyclone separators can be installed. Moreover, contrary to prior art teachings, wet biomass materials may be combusted at such reduced combustion temperatures.

Notwithstanding the many advantages offered by fast fluidized bed reactors, as enumerated above, the high cost of constructing and maintaining the extremely large external separation cyclones and large diameter standpipe required for recirculation of the entrained solids at the rate necessary to maintain the bed in the fast fluidization regime constitutes a severe economic impediment to widespread commercial utilization of such reactors. In this regard, prior art fast fluidized bed combustors are known which employ heat exchanger tube-lined walls in the entrainment region of the combustor (i.e., parallel to the flow). Such combustors rely primarily on the transfer of radiant heat from gases which typically are heavily laden with solids. Nevertheless, such combustors require an extremely large internal volume. Furthermore, still higher combustion rates are desired in fast fluidized bed boilers, with a concomitant reduction of the combustion temperature, and thus the size of the combustor so as to reduce the cost of construction.

In the past, cyclone combustors which produce a cyclone of turbulent gases within the combustion chamber have been employed for combusting various solid materials, including poor quality coal and vegetable refuse, as disclosed, for example, in "Combustion in Swirling Flows: A Review," N. Syred and J. M. Beer, *Combustion and Flame*, Vol. 23, pp. 143–201 (1974). Such cyclone combustors do not, however, involve the use of fluidized beds.

Although providing high specific heat release, prior art cyclone combustors suffer the following disadvantages: (1) the size of the usable fuel particles is limited to 0.25 inch (average effective diameter); (2) fuel moisture content is limited to about 3–5%; (3) at close to stoichiometric combustion, there is no means to control combustion temperature below the fusion point; and (4) erosion of refractory linings may occur in some instances.

Although the ordinary fluidized bed incinerator system described in U.S. Pat. No. 4,075,953 to Sowards, for example, is provided with a vortex generator, this system does not exhibit the combustion characteristics associated with conventional prior art cyclone combustors. In particular, the specific heat release is quite low (about $0.2 \times 10^6$ Kcal per cubic meter per hour) and the Swirl number [defined in terms of combustor input and exit parameters as S=(Input Axial Flux of Angular Momentum)/(De/2×Exit Axial Flux of Linear Momentum), where $D_e$ is the combustor exit throat diameter] is no greater than about 0.07.

Likewise, while the conventional combustion furnace described in U.S. Pat. No. 4,159,000 employs tangentially disposed air inlets, it does not achieve the combustion characteristics of conventional cyclone combustors (e.g., it exhibits a lower Reynolds number and lower specific heat release).

In conventional, i.e., non-circulating, fluidized bed reactors for combusting particulate material, the material to be combusted is fed over a bed of granular material, usually sand. In such reactors, it is desirable to be able to vary the amount of particulate material fed to the reactor and, concomitantly, the amount of pressurized air supplied to the reactor over as wide a range as possible. The hydrodynamic turndown ratio of a reactor, which is defined as the ratio of pressurized air flow at maximum reactor load to pressurized air flow at minimum reactor load, is a measure of the ability of a reactor to operate over the extremes of its load ranges. Notwithstanding the need for a fluidized bed reactor with turndown ratios in excess of 2 to 1, so as to improve the ability of the reactor to respond to varying power demands, the prior art has not satisfactorily provided a solution.

By way of example, prior art non-circulating fluidized bed boilers are known which employ an oxidizing fluidized bed for heat generation. In such boilers, relatively high heat releases and heat transfer directly from the fluidized bed material to heat exchange surfaces immersed therein serve to enhance the efficiency of the boiler, thereby reducing the boiler dimensions required to produce the desired thermal output, when compared with traditional boiler designs. Although high heat exchange efficiency is inherent in the operation of such oxidizing fluidized bed boilers, such boilers have a low turndown ratio, requiring a relatively narrow range in the variation of fuel consumption and heat output. These disadvantages have impeded widespread commercialization of such oxidizing fluidized bed boilers.

SUMMARY OF THE INVENTION

The present invention, in a radical departure from the conventional fast (circulating) fluidized bed reactors discussed above, has overcome the above-enumerated problems and disadvantages of the prior art by supplying pressurized secondary air tangentially into the upper region (vapor space) of a circulating fluidized bed reactor so as to create a cyclone of high turbulence, whereby the reaction rate is significantly increased. As used herein, and in the accompanying claims, the term "vapor space" means the region of a circulating fluidized bed combustor where combustion of vapor occurs, accompanied by combustion of previously uncombusted solid carbon. This region is also known in the art as the "free board" region.

It is an object of the invention to provide a circulating fluidized bed reactor utilizing a cyclone of turbulent gases in a cylindrically shaped upper region of the reactor so as to provide a more intense reaction, and therefore a significantly improved reaction rate, a lower reaction temperature (if required), and a higher specific heat release, compared to prior art circulating fluidized bed reactors. A further object is to provide a reactor having a shorter fluidizing gas residence time required to complete the reaction to the desired level. In particular, specific heat releases in excess of about 1.5 million Kcal per cubic meter per hour are believed to be obtainable in fluidized bed combustion according to the present invention. The foregoing advantages will permit a significant reduction in the size and, a fortiori, the cost of constructing the circulating fluidized bed reactor of the present invention. This will be true in adiabatic combustor, boiler, and gasification applications of the invention. It is anticipated, for example, that several times less internal volume will be required for a combustor constructed in accordance with the present invention, and for boiler applications, at least about 3–5 times less heat transfer surface area will be needed.

A further reduction in cost is provided in one embodiment of the invention by eliminating the need for an external solids separator (cyclone).

A further object of the invention is to provide a combustion system for burning combustible materials having a high moisture content, and a wide particle size distribution, e.g., ranging from a few microns to tens of millimeters (effective diameter).

Still another object of the invention is to provide an improved boiler system having a high turndown ratio and easier start-up than prior art systems. It is an additional object of the invention in this regard to provide a separate fluidized bed heat exchanger adjacent to the circulating fluidized bed reactor for cooling the entrained solids exiting from the reactor prior to their re-entry into the reactor. The heat exchanger is fluidized in the bubbling regime and contains boiler, superheater, evaporator, and/or economizer coils immersed in the bubbling fluidized bed, with the further objective of significantly reducing the heat exchanger surface area required for effective heat transfer. In such an overall system (circulating fluidized bed reactor and adjacent bubbling fluidized bed heat exchanger), it is a further objective to eliminate the vertical heat exchanger tube-lined walls previously utilized in the upper region (vapor space) of prior art circulating fluidized bed reactors, thereby considerably reducing the cost of constructing such a system.

To achieve the objects and in accordance with the purposes of the invention, as embodied and broadly described herein, a method of operating a fast fluidized bed reactor according to the invention comprises: (1) providing a substantially upright fluidized bed reactor containing a bed of granular material and having an upper and a lower region, the upper region having a cylindrically shaped interior surface; (2) feeding matter to be reacted into the lower region of the reactor; (3) supplying a first stream of pressurized air to the reactor through a plurality of openings in the lower region at a sufficient velocity to fluidize the granular material in the circulating regime, whereby at least a portion of the granular material is continually entrained upward into the upper region; (4) tangentially supplying a second stream of pressurized air to the upper region of the reactor through at least one opening in the cylindrical interior surface of the upper region (preferably two, or more, oppositely disposed openings are provided); (5) maintaining a Swirl number of at least about 0.6 and a Reynolds number (related to the combustor exit gas velocity and throat diameter, ($D_e$) of at least about 18,000 in the upper region of the reactor for providing a cyclone of turbulence in the upper region which increases the rate of reaction in the reactor, wherein, at maximum operating capacity for the reactor, the second stream of air constitutes in excess of about 50% of the total pressurized air fed to the reactor; and (b 6) removing a portion of the granular material and reaction gases from the upper region of the reactor through an exit port situated adjacent to the upper boundary of the cyclone of turbulence, separating the portion of the granular material from the reaction gases and returning the separated granular material to the lower region of the reactor.

In one embodiment of the invention, the separating step is carried out in an adjacent cyclone separator. However, in accordance with another embodiment of the invention, cyclone separators are not utilized. Such an embodiment is generally similar to the above-described method, except for the following steps: (1) providing a closed annular chamber concentrically surrounding at least the upper portion of the upper region of the reactor and operatively connected at its lower end to the lower region of the reactor, the cylindrical interior surface of the upper region of the reactor having an annular gap located in its upper portion and extending into the annular chamber; and (2) passing at least a portion of the turbulently flowing granular material from the upper region of the reactor through the gap and into the annular chamber by centrifugal force, thereby separating the portion of the granular material from the reaction gases present in the upper region, and returning the separated granular material by the force of gravity through the lower end of the annular chamber into the lower region of the reactor.

The present invention is directed to an improvement in a method of operating an upright circulating fluidized bed reactor containing a bed of granular material fluidized by a first stream of pressurized air, comprising: (1) entraining at least a portion of the granular material in the first stream of air, thereby elevating it into a cylindrically shaped upper region of the reactor; (2) creating a cyclone of turbulent gases in the upper region of the reactor having a Swirl number of at least about 0.6 and a Reynolds number of at least about 18,000 for turbulently flowing the elevated portion of granular material, by tangentially introducing a second stream of pressurized air into the upper region of the reactor, wherein, at maximum operating capacity for the reactor, the second stream of air constitutes in excess of about 50% of the total pressurized air fed to the reactor; and (3) returning the elevated portion of granular material from the upper region of the reactor to the bed of granular material at a location beneath the cyclone of turbulent gases.

Typically, the method of the present invention is performed in an adiabatic mode, in which the total pressurized air supplied is in excess of the stoichiometric amount needed for combustion or below the stoichiometric amount, i.e., for gasification conditions; or in a non-adiabatic mode in which a heat exchange surface is provided in the fluidized bed for removing heat from the bed.

In addition to the above-described methods, the present invention is also directed to a fast fluidized bed reactor, comprising: (1) a substantially upright fluidized bed reaction chamber for containing a bed of granular material, the chamber having an upper and a lower region, the upper region having a cylindrically shaped interior surface; (2) means for feeding matter to be reacted into the lower region of the reaction chamber; (3) means for supplying a first stream of pressurized air to the reaction chamber through a plurality of openings in the lower region at a sufficient velocity to fluidize the granular material in the circulating regime, whereby at least a portion of the granular material is continually entrained upward into the upper region; (4) means for tangentially supplying a second stream of pressurized air to the upper region of the reaction chamber through at least one opening in the cylindrical interior surface, and preferably at least two oppositely disposed openings, the second stream being supplied, and said reactor being constructed, in a manner adapted to provide a Swirl number of at least about 0.6 and a Reynolds number of at least about 18,000 in the upper region, thereby creating a cyclone of turbulence in the upper region which increases the rate of reaction in the chamber, wherein at maximum operating capacity for the reactor, the second stream of air constitutes in excess of about 50% of the total pressurized air fed to the reaction chamber; and (5) means for separating the granular material and the reaction gases exiting from the reaction chamber through an exit port situated adjacent to the upper boundary of the cyclone of turbulence, and returning the separated granular material to the lower region of the reaction chamber.

As embodied herein, the means for separating the granular material and reaction gases may comprise a cyclone separator. However, as broadly embodied herein, the present invention is further directed to a fast fluidized bed reactor which does not include cyclone separators. Such a reactor is generally similar to that described above, except for the following structure: a closed annular chamber concentrically surrounding at least the upper portion of the upper region of the reaction chamber and operatively connected at its lower end to the lower region of the reaction chamber, the cylindrical interior surface of the upper region of the chamber having an annular gap located in its upper portion and extending into the annular chamber, whereby at least a portion of the turbulently flowing granular material exits from the upper region of the reaction chamber, thereby separating the granular material from the reaction gases present in the upper region, the separated granular material being withdrawn from the upper region by centrifugal force and returned by the force of gravity through the lower end of the annular chamber into the lower region of the reaction chamber.

The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 2a is a diagrammatic vertical section view of a fast fluidized bed boiler constructed in accordance with the invention;

FIG. 2b is a schematic illustration of a fluidizing air valving arrangement suitable for use in the modified sluice shown in FIG. 2a and FIG. 4.

FIG. 3 is a diagrammatic vertical section view of a fast fluidized bed reactor constructed in accordance with another embodiment of the invention having no cyclone separator;

FIG. 4 is a diagrammatic vertical section view of a fast fluidized bed boiler according to a further embodiment of the invention.

DESCRIPTION OF THE PREFERRED EMBODIMENTS

Figure 1:
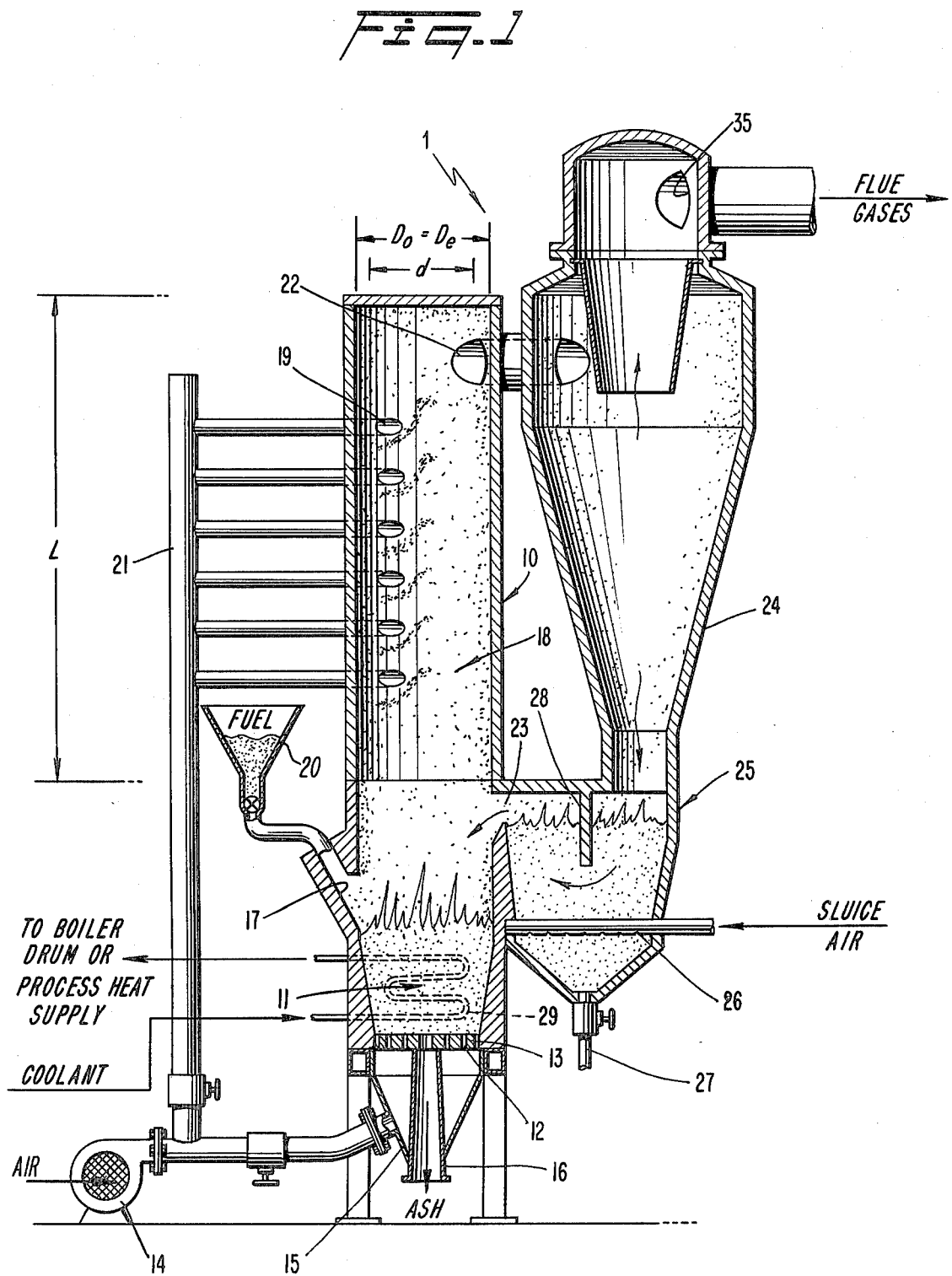
FIG. 1 is a diagrammatic vertical section view of a fast fluidized bed reactor constructed in accordance with the present invention.

Reference will now be made in detail to the presently preferred embodiments of the invention, examples of which are illustrated in the accompanying drawings.

One preferred embodiment of the fast (circulating) fluidized bed reactor of the present invention is shown in FIG. 1. As shown, the reactor of the present invention may comprise, for example, a combustor, represented generally by the numeral 1. In accordance with this embodiment of the invention, the combustor 1 includes a substantially upright fluidized bed combustor chamber 10 containing a fluidized bed of granular material in its lower region 11. Preferably, the interior surface of lower region 11 is substantially conically shaped and the cross-sectional area of the bottom of lower region 11 is smaller than that of upper region 18, as shown. As will be discussed more fully below, such a size and shape facilitates the obtaining of the required Swirl number, by permitting a reduction in the fluidizing gas flow and, consequently, an increase in the "secondary" air. The granular bed material is preferably ash or sand, or another inert material.

The granular material is fluidized in the fast (circulating) fluidization regime with pressurized oxygen-containing gas (e.g., air), referred to herein as "primary" air, which is supplied as a stream through a plurality of openings 12 extending through support surface 13. As will be more fully discussed below, the primary air supplied through openings 12 preferably constitutes less than about 50% of the total air supplied to combustor chamber 10, i.e., the air required for the combustion process. Openings 12 may comprise conventional pressurized air distribution apertures or nozzles. A source of pressurized air, e.g., blower 14, feeds the air to a plenum chamber 15 beneath support surface 13. Chamber 15 supplies the air to openings 12. A separate conduit 16 extends through support surface 13 for removing refuse, such as tramp material and/or agglomerated ash, etc., from combustor chamber 10.

Combustor 1 further includes means for feeding combustible matter to the lower region 11 of combustor chamber 10 through inlet 17. As embodied herein, such means may comprise any suitable conventional mechanical feeding mechanism or, as shown, pneumatic feeder 20. The combustible matter may be introduced into or above the fast fluidized bed, and undergoes complete drying, volatilization, decrepitation and partial combustion processes in the lower region 11 of combustor chamber 10 to an extent limited by the free oxygen available in the fluidizing gas. A portion of the granular bed material, unburnt fuel, gaseous volatile matter, solid carbon and ash is carried (i.e. entrained) by the flue gases into an upper region 18 of combustion chamber 10.

In sharp contrast to prior art fast fluidized bed reactors, the fast fluidized bed reactor in accordance with the present invention does not provide for feeding the entrained granular bed material, unburnt fuel, solid carbon, ash, gases, etc. directly into a solids-gas separator (e.g., a cyclone separator). Rather, as noted above, the entrained solids and gases are carried upward into the upper region 18 of combustor chamber 10, where further combustion takes place.

It is generally known that the quantity of particles transported by an ascending gas is a function of the gas flow velocity to the third to fourth power. Thus, greater solids reaction surface can be achieved by: (a) maintaining maximum solids' saturation in the ascending gas flow, which may be achieved by solids' return to the fluidized bed using an outer separation cyclone, and (b) increasing the vertical velocity of the fluidizing gas to a desired level sufficient to provide the desired carryover from the fluidized bed into upper region 18. For any fuel having a given specific ash particle size distribution, this vertical gas velocity must be sufficiently high, as noted above, but must not be so high as to cause intensive erosion of the refractory liner, which is preferably provided on the interior surface of upper region 18, due to very high ash concentration in this region, as will be discussed below. The interior surface of upper region 18 is cylindrically shaped in order to achieve swirling flow in the upper region, as discussed more fully below.

In accordance with the invention, means are provided for tangentially supplying a second stream of pressurized air (referred to herein as "secondary" air) to the upper region 18 of combustor chamber 10 through at least one opening 19, and preferably at least two oppositely disposed openings 19. Still more preferably, a plurality of pairs of openings 19 are provided at several aggregate points in upper region 18. As shown in FIG. 1, in one advantageous embodiment the plurality of pairs of oppositely disposed openings are vertically aligned and spaced apart throughout upper region 18. (The cross-sectional view shown in FIG. 1 necessarily depicts only one opening of each pair of openings.)

As embodied herein, a source of pressurized air, e.g., conventional blower 14, feeds the secondary air to, for example, a vertical manifold 21. As will be discussed in greater detail in the ensuing paragraphs, the secondary air preferably constitutes more than about 50% of the total air fed to combustor 1, i.e., the total air flow required for the reaction process. As will be brought out below, under certain limited circumstances, as, for example, when the temperature of the secondary air is above ambient, the secondary air may comprise somewhat less than 50%, e.g., about 30-40%, of the total air supplied.

Furthermore, it is critical that the secondary air be supplied at a sufficient velocity, and that the geometric characteristics of the interior surface of upper region 18 be adapted, to provide a Swirl number (S) of at least about 0.6 and a Reynolds number (Re) of at least about 18,000, which are required to create a cyclone of turbulence in upper region 18. Preferably, the reactor of the present invention is constructed and operated in a manner adapted to yield these minimum values of Swirl number and Reynolds number when operating at minimum capacity (i.e., on the order of 20% of maximum capacity), so that higher values can be obtained at maximum capacity. On the other hand, the Swirl number and Reynolds number must not exceed those values which would result in an unacceptable pressure drop through combustion chamber 10.

It is this cyclone of turbulence which enables the reactor of the present invention to achieve specific heat release values higher than 1.5 million Kcal per cubic meter per hour when utilized as a combustor, thereby significantly increasing the rate of combustion. As a result, the size of the combustor of the present invention can be significantly reduced, compared to prior art combustors which have a specific heat release of only about 0.2 million Kcal per cubic meter per hour.

The interior of the upper region 18 of combustion chamber 10 must exhibit certain geometric characteristics, together with the applicable gas velocities, in order to provide the above-noted requisite Swirl number and Reynolds number. These features are discussed generally in "Combustion in Swirling Flows: A Review," supra, and the references noted therein, which publications are hereby specifically incorporated herein by reference.

By way of illustrative hypothetical example, for an adiabatic combustor having a capacity ($Q_{com}$) of 10 million Kcal/hr, a combustion temperature ($T_{com}$) of 1273° K., a secondary (tangential) air temperature ($T_{air}$) of 313° K. (ambient), a specific heat release (q) of 2 million Kcal/hr, and a fluidized bed bottom gas velocity of ($W_{FB}$) of 2.3 m/sec, and assuming combustion of wet wood chips having a fuel moisture content of 55%, it can be shown that a Swirl number (S) in excess of 0.6, a Reynolds number (Re) in excess of 18,000, and an acceptable total pressure drop across the combustor 10 can be obtained if the combustor is properly designed and a large enough fraction ($\eta$) of the total air flow into the combustor 10 is introduced tangentially into upper region 18, i.e., as secondary air. Specifically, with reference to FIG. 1, it can be shown that:

$$S = \frac{(\phi \times \eta)^2 \times X}{Y} \times \frac{T_{air}}{T_{com}} \quad (1)$$

$$\phi = \frac{\text{Air flow required for combustion above stoichiometric}}{\text{Combustion gas flow formed at combustion above stoichiometric}} \quad (2)$$

$$Y = \frac{\text{Total cross-sectional area of tangential air inlets 19}}{\text{Cross-sectional area of upper region 18}} \quad (3)$$

$$X = \frac{\text{Diameter of reactor exit throat}}{\text{Diameter of upper region 18}} = \frac{D_e}{D_o} \quad (4)$$

$$\eta = 1 - \frac{\tau \times W_{FB}}{f \times Z \times D_o} \quad (5)$$

$\tau$ = Residence time of combustion gases in combustor 10 (sec)     (6)

$$f = \frac{\text{Cross-sectional area of region 18}}{\text{Cross-sectional area of fluidized bed bottom}} = \frac{D_o^2}{d^2} \quad (7)$$

$d$ = Diameter of fluidized bed bottom     (8)

$$Z = \frac{\text{Length of upper region 18}}{\text{diameter of upper region 18}} = \frac{L}{D_o} \quad (9)$$

It can thus be shown that, for a fuel for which $\phi$ equals about 0.8 and which is combusted in such an adiabatic combustor 10 constructed and operated such that f=2.2, Z=2.2, $D_o$=1.425m=$D_e$, Y=0.1163m²/1.594m²=0.073, and the inlet and outlet aerodynamic coeficients are 2 and 4, respectively, $\tau$ will then equal 0.14 sec, $\eta$ will equal 0.95, S will be 1.86, Re will be 187,724, and the total pressure drop through the combustor will be on the order of about 400 mm w.c., when the unit is operated at 100% capacity. When such a combustor is operated at 20% capacity, $\rho$ will be increased to a value of 0.71 sec, $\eta$ will become 0.765, S=1.2, Re=37,630 and the total pressure drop will be about 16 mm w.c., provided the value of Y is kept constant and the inlet and outlet aerodynamic coefficients are 2 and 4, respectively.

From the above analysis, and particularly Equation No. 1, it can be seen that a reduction in the combustion temperature will facilitate the obtaining of the requisite Swirl number. This fact may be used to advantage in combusting wet biomass materials in accordance with the present invention at temperatures within the range of from about 500° C. to 1000° C., contrary to prior art teachings concerning the need for combustion temperatures on the order of about 1000° C.

As is also apparent from the Equations set forth above, construction of combustor 10 in a manner such that the cross-sectional area of the fluidized bed bottom is smaller than that of upper region 18 is preferred, since this will facilitate the obtaining of the requisite Swirl number. This is especially important when high moisture content fuel is used and when low pressure drops are desired. Moreover, the use of a smaller bottom cross-sectional area permits the use of higher bottom gas velocities, which, in turn, permits combustion of a fuel having larger particle sizes, while insuring that such particles can be fluidized in the bed.

In constructing a combustor in accordance with the present invention, it is clear from the above analysis that many parameters may be varied in order to achieve the requisite Swirl number and Reynolds number. For example, the values of the parameters X, Y, and Z can generally be adjusted as necessary, within the constraints imposed by the need to obtain an acceptably low pressure drop through the entire system. In this regard, it should be noted that the maximum acceptable pressure drop through a combustor is generally on the order of 500–1000 mm w.c. for wet biomass combustion, and somewhat higher for coal combustion. However, as a result of the improved heat transfer exhibited by the overall system of the present invention, a pressure drop of 1000 mm w.c. should also be achievable for coal combustion.

As a further hypothetical example, for a non-adiabatic combustor having a capacity ($Q_{com}$) of 7.91 million Kcal/hr, a combustion temperature ($T_{com}$) of 1123° K., an elevated tangential air temperature ($T_{air}$) of 573° K., a specific heat release (q) of 2.5 million Kcal/m³/hr, and a fluidized bed bottom gas velocity ($W_{FB}$) of 2.3 m/sec, and assuming combustion of coal having a relatively low moisture content, it can be shown that a Swirl number (S) in excess of 0.6, a Reynolds number (Re) in excess of 18,000, and an acceptable total pressure drop across the combustor 10 can be obtained if the combustor is properly designed and a large enough fraction ($\eta$) of the total air flow into the combustor 10 is introduced tangentially into upper region 18. Specifically, it can be shown, based on the equations discussed above, that for a fuel for which $\phi=0.94$ and which is combusted in such a nonadiabatic combustor 10 constructed and operated such that the inlet and outlet aerodynamic coefficients are 2 and 4, respectively, $f=1.8$, $Z=3.3$, $D_o=1.069$ mm$=D_e$, and $Y=0.067m^2/0.897m^2=0.075$, $\tau$ will equal 0.308 sec, $\eta$ will equal 0.89, S will equal 4.75, Re will equal 90,000, and the total pressure drop through the combustor will be about 350 mm w.c., when the unit is operated at 100% capacity. When such a combustor is operated at 20% capacity, $\tau$ will be 1.54 sec, $\eta$ will become 0.445, $S=1.2$, $Re=18,000$, and the total pressure drop through the combustor will be approximately 15 mm w.c., provided the value of Y is kept constant.

From the above hypothetical comparative analysis, certain conclusions can be reached:

(1) The fraction ($\eta$) of the total air flow into the combustor which must be introduced tangentially as secondary air (via ports 19) in order to achieve the requisite Swirl number and Reynolds number can be reduced if the temperature of the secondary air ($T_{air}$) is increased. Similarly, $\eta$ is also reduced for fuels for which the value of $\phi$ is larger (e.g., for lower moisture content fuels). Specifically, from the above equations it can be shown that, under certain conditions, e.g., $T_{air}=$ in excess of about 150° C. and $\phi=0.94$, only about 30% to 50% of the total air need be supplied as secondary air in order to achieve a Swirl number in excess of 0.6, when operating the combustor described above at 20% (i.e., at very low) capacity; although a value of $\eta$ in excess of about 0.5 is still required at maximum (at or about 100%) capacity. Furthermore, such a combustor will, as shown above, exhibit a lower total pressure drop.

(2) Where the temperature ($T_{air}$) of the tangential air is near ambient, i.e., after passing through blower 14 (e.g., 40° C.), the tangential air must comprise in excess of about 50%, and preferably in excess of about 80%, of the total air flow into the combustor at 100% combustor capacity, and must comprise in excess of about 50% of the total air flow into the combustor, at the lowest partial combustor capacity desired (e.g., 20%).

(3) Items (1) and (2) above relate to the combustion of carbonaceous fuel in air. Slight variations can be expected for the reaction of materials other than those mentioned above in air or other gases. However, the criticality of maintaining a Swirl number in excess of about 0.6 and a Reynolds number in excess of about 18,000 will not change.

Fuel combustion is substantially completed in the cyclone of turbulence in upper region 18 at a temperature below the fusion point, which provides a friable ash condition.

In accordance with one embodiment of the invention, as shown in FIG. 1, combustor 1 further comprises means for separating the granular bed material from the combustion gases exiting from upper region 18 through exit port 22 located near the top of combustor chamber 10, and adjacent to the upper boundary of the cyclone of turbulence, and returning the separated material to the lower region 11 of combustor chamber 10 via inlet port 23. As embodied herein, the means for separating the granular bed material from the combustion gases includes a suitable conventional cyclone separator 24 (or a plurality thereof) operatively connected between inlet port 23 and exit port 22 at the top of combustor chamber 10. Flue gases exit from cyclone separator 24 through port 35, and are then typically fed to the process heat supply or boiler, as the case may be. For example, the exhaust gases exiting from cyclone separator 24 may be fed to kilns, veneer dryers, etc.

Preferably, the separated granular material is not fed directly from cyclone separator 24 to inlet port 23, but, instead, enters a sluice 25 operatively connected between separator 24 and port 23. Sluice 25 includes a standard, i.e., bubbling, fluidized bed comprised of the separated material. The separated material is fluidized with pressurized air supplied through a plurality of openings 26, and over-flows through inlet port 23 into the fluidized bed in lower region 11 of combustor chamber 10. Ash tramp material may be removed through conduit 27 as needed. Sluice 25 contains a solid partition 28 for eliminating cross flow of gases between the lower region 11, combustor chamber 10 and cyclone separator 24. Since the fluidized bed acts as a liquid, sluice 25 operates in the same manner as a conventional liquid trap, and functions primarily to prevent the primary and secondary air supplied to reactor chamber 10 from bypassing upper region 18 of reactor chamber 10.

The present invention can be applied to most nonuniform combustible particulate solid materials, such as, for example, wood wastes, municipal refuse, carbonaceous matter (e.g., coal) and the like. However, it also can be used for liquid and gaseous fuel.

Additional beneficial features of the above-described embodiment of the invention include the following: (a) low temperature combustion can be utilized, if desired, as for example, in the combustion of biomass fuels at temperatures on the order of 500°–1000° C.; (b) the pressure drop of separation cyclone 24 is typically in the approximate range of 3"–6" w.c. and, if it is overcome by a draft fan (not shown), the pressure in combustor chamber 10 where fuel is fed in can be maintained at about one atmosphere, negative or positive (this will simplify the fuel feeding system); and (c) due to the fact that the fluidized bed in combustor 1 operates at the pneumatic transport gas velocity, which is tens of times higher than the terminal fluidizing velocity, the reduction of the combustor's capacity is practically unlimited, i.e., it lies beyond 5:1.

The method of the present invention can also be used for boiler applications which, from an economical standpoint, require low excess air for combustion and, therefore, heat absorption in the fluidized bed (lower region 11). In such embodiments, the cross section of lower region 11 is preferably of quadrangular shape and of a larger size in order to accommodate a heat exchange surface of reasonable size in the fluidized bed volume. This is particularly so when the combustion temperature and/or the fuel moisture content are low. As shown in the dashed lines in FIG. 1, the heat exchange surface may, for example, comprise a heat exchanger tube arrangement 29 in lower region 11. The tube arrangement may be of any suitable size, shape and alignment (including vertical tubes), as is well known in the art. Preferably, heat exchanger tube arrangement 29 will be operatively connected to a process heat supply or to a conventional boiler drum, not shown, for boiler applications. The heat exchanger cooling media may comprise any suitable conventional liquid or gaseous media, such as, for example, air. In boiler applications, the exhaust gases exiting from cyclone separator 24 are preferably fed to the boiler convective tube bank in a conventional manner.

The present invention, as broadly embodied herein, is also directed to a fast fluidized bed reactor having a cyclone of turbulence in the upper region of a reactor chamber, as described above, but wherein the need for an external cyclone separator is eliminated, thereby permitting a significant reduction in the size, and thus the cost, of the overall system.

Specifically, in accordance with the embodiment of the invention illustrated in FIG. 3, fast fluidized bed reactor 2 includes a substantially upright fluidized bed reactor chamber 10 containing a fluidized bed of granular material in its lower region 11. For ease of understanding, like reference numerals will be used, where appropriate, to identify features of this embodiment which are identical, or substantially identical, to those shown in the embodiment depicted in FIG. 1. The granular material is fluidized in the fast fluidization regime in the same manner and under the same conditions as in FIG. 1 and tramp material is removed as disclosed.

Reactor 2 further includes a conventional feeder 20 for feeding combustible particulate matter to the lower region 11 of reactor chamber 10 through inlet 17 in the manner discussed in conjunction with FIG. 1.

As in the embodiment of FIG. 1, granular bed material, unburnt combustible matter, gaseous volatile matter, solid carbon and ash are entrained by the flue gases into an upper region 18 of reactor chamber 10, where secondary air is tangentially supplied through a plurality of openings 19 in the cylindrically shaped interior surface of upper region 18 in the same manner as in FIG. 1. As fully explained above, the secondary air normally must constitute more than about 50% of the total air fed to reactor 2, and must be supplied at a sufficient velocity such that, together with the geometric characteristics of the interior surface of upper region 18, a Swirl number of at least about 0.6 and a Reynolds number of at least about 18,000 are provided in upper region 18, thereby creating a cyclone of turbulent gas flow in which combustion is substantially completed.

In accordance with this embodiment of the invention, and in contrast to the embodiment of FIG. 1, separation of the flue gases and the solids carried thereby in upper region 18 does not require the use of a conventional cyclone separator. Rather, a closed annular chamber 30 concentrically surrounds at least the upper portion of upper region 18 and is operatively connected at its lower end to lower region 11 via feed openings 31 which communicate with the fluidized bed. The interior surface of upper region 18 possesses an annular gap (clearance) 32 located in its upper portion and communicating with annular chamber 30. The turbulently flowing granular material and other particulate solids carried by the flue gases are entrained by the ascending cyclonic gas flow up to the gap 32. At this point, the entrained particles, being subjected to strong centrifugal forces, are thrown through the gap 32 into annular chamber 30, and are thus effectively separated from the flue gases. The volume of flue gases present in annular chamber 30 will exhibit a spinning flow, albeit at a much lower rate of revolution. The tangential velocities in this revolving volume of gases are sharply reduced, with the increased radius of annular chamber 30. Consequently, as the particles enter annular chamber 30 and approach the outer wall of the chamber, where there is essentially no ascending gas flow, they will be influenced by centrifugal force and the force of gravity, which will cause them to drop to the lower end of chamber 30 and fall through feed openings 31 into the lower region 11 of reactor chamber 10 beneath the surface of the bed.

At least one tangential secondary air port 19 must be positioned in the portion of the inner surface of upper region 18 which extends above annular gap 32, for the purpose of maintaining a spinning gas flow in gap 32. Preferably, at least one pair of oppositely disposed ports is provided. Flue gases containing a very low solids concentration exit from the top of reactor chamber 10 through tangentially or centrally situated exit port 22 in the manner discussed in conjunction with FIG. 1.

As a result of the elimination of conventional external cyclone separators, the embodiment of the invention shown in FIG. 3 will exhibit less pressure drop than the embodiment shown in FIG. 1.

As with the embodiment shown in FIG. 1, the fast fluidized bed reactor shown in FIG. 3 can be utilized for adiabatic combustor and boiler applications, as well as for fluidized bed gasification. In the case of boiler applications, as discussed in connection with FIG. 1, a heat exchanger tube arrangement 29 (shown in dashed lines) is provided in the lower region 11 of the reactor.

Turning now to FIGS. 2a and 4, these figures illustrate further embodiments of the invention generally similar in structure and operation to the embodiments shown in FIGS. 1 and 3, respectively, but having significantly higher turndown ratios. Like reference numerals have been used in FIGS. 2a and 4 to identify elements identical, or substantially identical, to those depicted in FIGS. 1 and 3, respectively. Only those structural and operational features which serve to distinguish the embodiments shown in FIGS. 2a and 4 from those shown in FIGS. 1 and 3, respectively, will be described below.

In particular, the embodiments shown in FIGS. 2a and 4 include a cooling fluidized bed 40 (with a heat exchanger) situated immediately adjacent to the lower region 11 of reactor chamber 10 and having an overflow opening 41 communicating with lower region 11. Cooling fluidized bed 40 comprises an ordinary (i.e., bubbling) fluidized bed of granular material, and includes a heat exchange surface, shown here as heat exchanger tube arrangement 42, which contains water or another fluid, such as, for example, steam, compressed air, or the like. The fluid entering tube arrangement 42 is preferably supplied from a conventional boiler steam drum (not shown). The bed is fluidized in a conventional manner by tertiary pressurized air supplied from a plenum 43 through openings 44 in a support surface, and ashes are removed (when required) through conduit 45.

The fluidized bed is comprised of the granular material and other solids separated in cyclone separator 24 or annular chamber 30, as the case may be. These solids are thus at a relatively high temperature. Heat exchanger tube arrangement 42 functions as a cooling coil to cool the fluidized bed, with the cooled solids overflowing the bed through opening 41 and re-entering lower portion 11 of reactor chamber 10 to be again fluidized therein. The fluid passing through tube arrangement 42 is consequently heated and preferably fed, for example, to a conventional boiler drum (not shown) in a steam generation process.

The embodiments illustrated in FIGS. 2a and 4 further include a modified fluidized bed sluice 50 which is divided into three compartments 51, 52 and 53 by substantially solid partitions 54 and 55. Each of these compartments is fluidized in a conventional manner by a separate, regulatable stream of pressurized fluidizing air from separate fluidizing aperture systems 61, 62, and 63, respectively. (See FIG. 2b also.) Aperture systems 61, 62 and 63 are regulated by separate valves 71, 72, and 73, respectively. Compartments 51 and 52, together, function in the same manner as sluice 25 (FIG. 1), described above, to prevent cross flow of gases, with the separated solids from cyclone separator 24 (FIG. 2a) or from annular separation chamber 30 (FIG. 4) entering compartment 52 and being overflowed from compartment 51 through opening 23 into the fluidized bed in lower region 11 of reactor chamber 10. However, as will be described below, when the fluidized bed reactor 10 is in normal operation (functioning at full or partial loads), compartment 51 is not fluidized, and therefore plays no role in the recirculation of solids.

In normal operation, compartments 52 and 53, but not 51, are fluidized, i.e., valves 72 and 73 are open and valve 71 is closed. As a result, separated solids enter compartment 52 and overflow into cooling fluidized bed 40 as shown.

For a better understanding of how this embodiment functions to improve the turndown ratio, the required procedure to initially place it into operation from the cold condition to a full load and then turn it down to a desired level will be explained.

The ignition burner (not shown), preferably located above the lower region 11, is turned on, while primary, secondary, tertiary and sluice air are shut off. At the time when the combustor's refractory and its internal volume temperature exceed the solid fuel ignition temperature, the primary air, secondary air and sluice air are partially turned on, while compartment 53 of sluice 50 remains shut off (valve 73 is closed, FIG. 2b). From this moment, an adiabatic fluidized bed combustor scheme is in operation in reactor chamber 10, and when the temperature again exceeds the solid fuel ignition temperature, solid fuel is fed into a reactor chamber 10. After the solid fuel is ignited and, consequently, the exit gas temperature has risen, additional sluice air is then supplied to compartment 53 (by opening valve 73), and a fraction of the tertiary air is supplied. To keep the combustion temperature on the rise, at this time the secondary air flow is gradually increased, with a simultaneous increase in the solid fuel feed rate, and the ignition burner is shut off. If the gas exit temperature continues to rise, a further increase of secondary air flow and fuel feed rate should be pursued. At the point when the gas exit temperature achieves its highest designed level, the tertiary air flow rate must be continuously increased until it reaches its full rate. Simultaneously, the fuel rate and secondary air rate are also continuously increased. To achieve full load, the sluice compartment 51 air flow valve 71 (FIG. 2b) is closed until it is completely shut off. At this moment, if the gas exit temperature is at the desired level, the secondary air flow and fuel rate are not increased any further, and are then maintained in accordance with the fuel-air ratio required to obtain the most economical fuel combustion. At this point, the reactor can be considered as having full load (100% capacity). The minimum capacity of the reactor, i.e., desired turndown ratio, can be obtained if the sequence of operations outlined above is followed in reverse order, until the point where the ignition burner is shut off. By changing the sluice air flow in compartment 51 (by fully or partially closing valve 71, corresponding to the desired combustion temperature) and by changing the tertiary air flow, the combustion temperature can be further controlled at any desired combustor capacity (including maximum capacity, provided the surface of heat exchanger 42 has been over designed, i.e., so as to handle more than the amount of heat transfer normally contemplated).

In brief review, the key feature, in terms of obtaining a high turndown ratio according to the embodiments depicted in FIGS. 2a and 4, is the fact that the cooling fluidized bed heat exchange surface 42 may be gradually pulled out (but not physically) from the combustion process so as to keep the fuel-air ratio and combustion temperature at the required levels. Further, in addition, due to the fact that the fluidized bed of the combustor chamber operates at the pneumatic transport gas velocity (recirculation of most of its inventory) and is fluidized by air flow of much less than 50% (generally less than 20%) of the total air flow, the turndown ratio, from a hydrodynamic standpoint, is practically unlimited, i.e., lies beyond 5:1.

Furthermore, the above-desired boiler turndown ratio improvement has an additional advantage over known circulating fluidized bed boilers. Specifically, it requires less than one-half the heat exchange surface to absorb excessive heat from the circulating fluidized bed, due to the following: (a) the tubular surface 42 fully immersed in fluidized bed 40 is fully exposed to the heat exchange process, versus the vertical tube-lined walls in the upper region of the combustion chamber of prior art circulating fluidized bed boilers, in which only 50% of the tube surface is used in the heat exchange process; (b) the fluidized bed heat exchange coefficient in such a system is higher than that for gases, even heavily loaded with dust, and vertical tube-lined walls confining the combustion chamber of prior art circulating fluidized bed boilers. The latter fact results, in part, from the fact that it is possible, by using a separate fluidized bed 40, to utilize the optimum fluidization velocity therein, and the fact that fluidized bed 40 is comprised of small particles, e.g., fly ash.

If low temperature combustion is needed, it can be utilized in conjunction with the above-described boiler turndown ratio improvement, with the consequent effect upon aggregate combustor performance as described above.

It will be apparent to those of ordinary skill in the art that various modifications and variations can be made to the above-described embodiments of the invention without departing from the scope of the appended claims and their equivalents. As an example, although the invention has been described in the environment of combusting particulate material, such as wood wastes, municipal refuse, carbonaceous material, etc., it is apparent that the apparatus and method of the invention can be used in other environments in which fluidized bed reactors find utility, such as, for example, gasification and various chemical and metallurgical processes.

What is claimed is:

1. A method of operating a circulating fluidized bed combustion reactor, comprising:
   providing a substantially upright fluidized bed reactor containing a bed of granular material and having an upper region and a lower region, said upper region having a cylindrically shaped interior surface;
   feeding matter to be combusted into said lower region of the reactor;
   supplying a first stream of pressurized air to said reactor through a plurality of openings at the bottom of said lower region at a sufficient velocity to fluidize said granular material in the circulating regime, whereby at least a substantial portion of said granular material is continually entrained upward into said upper region;

tangentially supplying a second stream of pressurized air to said upper region of the reactor through at least one opening in said cylindrical interior surface, wherein, at maximum operating capacity for the reactor, said second stream of air constitutes in excess of about 50% of the total pressurized air fed to the reactor;

maintaining a Swirl number of at least about 0.6 and a Reynolds number of at least about 18,000 in said upper region for inducing in said entrained bed material and any gases present in said upper region a cyclone of turbulence and at least one, internally generated recirculation zone in said upper region which increases the rate of combustion in the reactor, and removing a portion of the entrained granular material and the gases resulting from combustion from said upper region of the reactor at a location adjacent the upper boundary of said cyclone of turbulence, separating said portion of the granular material from said combustion gases and returning said separated granular material to said lower region of the reactor.

2. A method as claimed in claim 1, wherein said separating step is carried out in a cyclone separator.

3. A method of operating a fast fluidized bed reactor, comprising:

providing a substantially upright fluidized bed reactor containing a bed of granular material and having an upper region and a lower region, said upper region having a cylindrically shaped interior surface;

feeding matter to be reacted into said lower region of the reactor;

supplying a first stream of pressurized air to said reactor through a plurality of openings in said lower region at a sufficient velocity to fluidize said granular material in the circulating regime, whereby at least a portion of said granular material is continually entrained upward into said upper region;

tangentially supplying a second stream of pressurized air to said upper region of the reactor through at least one opening in said cylindrical interior surface;

maintaining a Swirl number of at least about 0.6 and a Reynolds number of at least about 18,000 in said upper region for providing a cyclone of turbulence in said upper region which increases the rate of reaction in the reactor, wherein, at maximum operating capacity for the reactor, said second stream of air constitutes in excess of about 50% of the total pressurized air fed to the reactor;

removing a portion of the granular material and the reaction gases from said upper region of the reactor through an exit port situated adjacent the upper boundary of said cyclone of turbulence;

providing a cyclone separator operatively connected between said exit port and said lower region for separating said portion of the granular material from said reaction gases in said separator and returning said separated granular material to said lower region of the reactor, and further comprising the step of providing a fluidized bed trap operatively connected between said cyclone separator and said lower region of the reactor for receiving the separated granular material from the cyclone separator and overflowing it into said lower region of the reactor, said fluidized bed trap containing a solid partition for eliminating cross flow of gases between said reactor and said cyclone separator.

4. A method of operating a circulating fluidized bed combustion reactor, comprising:

providing a substantially upright fluidized bed reactor containing a bed of granular material and having an upper region and a lower region, said upper region having a cylindrically shaped interior surface;

feeding matter to be combusted into said lower region of the reactor;

supplying a first stream of pressurized air to said reactor through a plurality of openings at the bottom of said lower region at a sufficient velocity to fluidize said granular material in the circulating regime, whereby at least a substantial portion of said granular material is continually entrained upward into said upper region;

tangentially supplying a second stream of pressurized air to said upper region of the reactor through at least one opening in said cylindrical interior surface;

maintaining a Swirl number of at least about 0.6 and a Reynolds number of at least about 18,000 in said upper region for inducing in said entrained bed material and any gases present in said upper region a cyclone of high turbulence and at least one, internally generated recirculation zone in said upper region which increases the rate of combustion in the reactor, wherein, at maximum operating capacity for the reactor, said second stream of air constitutes in excess of about 50% of the total pressurized air fed to the reactor;

providing a closed annular chamber concentrically surrounding at least the upper portion of said upper region of the reactor and operatively connected at its lower end to said lower region of the reactor, said interior surface having an annular gap located in its upper portion and extending into said annular chamber; and passing at least a portion of the turbulently flowing entrained granular material from said upper region of the reactor through said gap and into said annular chamber by centrifugal force, thereby separating said portion of the granular material from the gases present in said upper region; and returning said separated granular material by the force of gravity through said lower end of the annular chamber into said lower region of the reactor.

5. A method as claimed in claim 1 or 4, further comprising the step of providing a heat exchange surface immersed in said lower region of the reactor for removing heat from the fluidized bed.

6. A method as claimed in claim 1, 3 or 4, further comprising the steps of directing at least a portion of the granular material separated from the reaction gases into a second fluidized bed situated adjacent to the lower region of the reactor and overflowing a portion of the granular material from said second fluidized bed into the lower region of the reactor, said second fluidized bed being fluidized in the bubbling regime and having a heat exchange surface immersed therein for removing heat therefrom.

7. A method as claimed in claim 6, including the step of supplying the heat removed from said second fluidized bed to a boiler or process heat supply.

8. A method as claimed in claim 1 or 4, wherein the total pressurized air supplied to said reactor is in excess of the stoichiometric amount needed for combustion.

9. A method as claimed in claim 1 or 4, including the step of gasifying solid or liquid fuel in said reactor, wherein the total pressurized air supplied to said reactor is less than the stoichiometric amount required for combustion.

10. A method as claimed in claim 1 or 4, wherein, at maximum operating capacity, in excess of about 80% of the pressurized air supplied to said reactor is supplied by said second stream of air, and said second stream of air is maintained at about ambient temperature.

11. A method as claimed in claim 1 or 4, wherein at about minimum operating capacity for the reactor, at least about 30% of the pressurized air supplied to said reactor is supplied by said second stream of air, and wherein the temperature of said second stream of air is maintained in excess of about 150° C.

12. A method as claimed in claim 1 or 4, wherein the temperature of said second stream of air is maintained at about ambient.

13. A method as claimed in claim 12, wherein at minimum operating capacity for the reactor, in excess of about 50% of the pressurized air supplied to said reactor is supplied by said second stream of air.

14. A method as claimed in claim 1 or 4, wherein the second stream of pressurized air is tangentially supplied through a plurality of openings in said cylindrical interior surface.

15. A method as claimed in claim 14, wherein the second stream of pressurized air is tangentially supplied to said reactor through a plurality of pairs of oppositely disposed openings in said cylindrical interior surface.

16. A method as claimed in claim 4, wherein the second stream of pressurized air is tangentially supplied to said reactor through a plurality of pairs of oppositely disposed openings in said cylindrical interior surface, at least one of said openings being situated above said annular gap.

17. A method as claimed in claim 15 or 16, wherein said plurality of pairs of oppositely disposed openings are vertically aligned and spaced apart throughout said upper region of the reactor.

18. A method as claimed in claim 1 or 4, wherein combustion takes place at a temperature within the range of from about 500° C. to about 1000° C. in said reactor.

19. In a method of operating an upright circulating fluidized bed combustion reactor containing material to be combusted and a bed of granular material fluidized by a first stream of pressurized air at a velocity sufficient to fluidize said granular material in the circulating regime, so as to entrain at least a substantial portion of the granular material in said first stream, thereby elevating said portion into a cylindrically shaped upper region of the reactor, said elevated portion being then externally returned from said upper region to said bed of granular material, the improvement comprising:

creating a cyclonic flow of turbulent gases and at least one, internally generated recirculation zone in said upper region of the reactor for turbulently flowing a portion of the material to be reacted, any gases present in said upper region, and said entrained portion of granular bed material by tangentially introducing a second stream of pressurized air into said upper region through at least two symmetrically arranged openings in the interior wall of the reactor, said second stream of air and the geometry of said upper region of the reactor being jointly adapted to maintain a Swirl number of at least about 0.6 and a Reynolds number of at least about 18,000 in said upper region, wherein at maximum operating capacity for the reactor, said second stream of air constitutes in excess of about 50% of the total pressurized air fed to the reactor; and removing said entrained portion of granular material and the combustion gases from said upper region of the reactor adjacent the upper boundary of said cyclone of turbulent gases.

20. A fast fluidized bed reactor, comprising:
(a) a substantially upright fluidized bed reaction chamber for containing a bed of granular material, said chamber having an upper region and a lower region, said upper region having a cylindrically shaped interior surface;
(b) means for feeding matter to be reacted into said lower region of the reaction chamber;
(c) means for supplying a first stream of pressurized air to said reaction chamber through a plurality of openings in said lower region at a sufficient velocity to fluidize and granular material in the circulating regime, whereby at least a portion of the granular material is continually entrained upward into said upper region;
(d) means for tangentially supplying a second stream of pressurized air to said upper region of the reaction chamber through at least one opening in said cylindrically shaped interior surface, said second stream being supplied, and said reactor being constructed, in a manner adapted to provide a Swirl number of at least about 0.6 and a Reynolds number of at least about 18,000 in said upper region, thereby creating a cyclone of turbulence in the upper region which increases the rate of reaction in said chamber, wherein, at maximum operating capacity for the reactor, the second stream of air constitutes in excess of about 50% of the total pressurized air fed to the reaction chamber; and
(e) cyclone separator means for separating the granular material and the reaction gases exiting from said reaction chamber and returning the separated granular material to said lower region of the reaction chamber, said cyclone separator means being operatively connected between an exit port in said reaction chamber situated adjacent to the upper boundary of said cyclone of turbulence and an inlet port located in said lower region of said reaction chamber, and further comprising a fluidized bed trap operatively connected between said cyclone separator and said inlet port for receiving the separated granular material from the cyclone separator and overflowing it into said inlet port, said fluidized bed trap containing a solid partition for eliminating cross flow of gases between said reaction chamber and said cyclone separator.

21. A fast fluidized bed reactor as claimed in claim 20, further comprising heat exchange surface means situated in said lower region of the reaction chamber for removing heat from the fluidized bed.

22. A fast fluidized bed reactor as claimed in claim 20, further comprising:

a second fluidized bed fluidized in the bubbling regime and situated adjacent to the lower region of said reaction chamber for receiving and fluidizing at least a portion of the granular material separated from the reaction gases, the second fluidized bed having an opening for overflowing a portion of the granular material into said lower region; and heat exchange surface means immersed in said second fluidized bed for removing heat therefrom.

23. A fast fluidized bed reactor as claimed in claim 20, wherein the horizontal cross-sectional area of said upper region of said chamber is larger than that of said lower region of said chamber.

24. A fast fluidized bed reactor as claimed in claim 23, wherein said lower region of said chamber is conically shaped.

25. A fast fluidized bed reactor as claimed in claim 20, wherein said means for tangentially supplying a second stream of pressurized air to said reaction chamber includes a plurality of openings in said cylindrical interior surface.

26. A fast fluidized bed reactor as claimed in claim 25, wherein said means for tangentially supplying a second stream of pressurized air to said reaction chamber includes a plurality of pairs of oppositely disposed openings in said cylindrical interior surface.

27. A fast fluidized bed reactor as claimed in claim 20, wherein said plurality of pairs of oppositely disposed openings are vertically aligned and spaced apart throughout said upper region of the reaction chamber.

28. A fast fluidized bed reactor as claimed in claim 21, further comprising boiler means operatively connected to said heat exchange surface means.

29. A fast fluidized bed reactor as claimed in claim 22, further comprising boiler means operatively connected to said heat exchange surface means.

30. A fast fluidized bed reactor as claimed in claim 22, wherein at least a portion of said lower region of said chamber is quadrangularly shaped in cross section, when viewed from above.

* * * * *